Nov. 29, 1938.  H. H. RUDD  2,138,430
CURRENT INDICATOR
Filed July 31, 1935   2 Sheets-Sheet 1
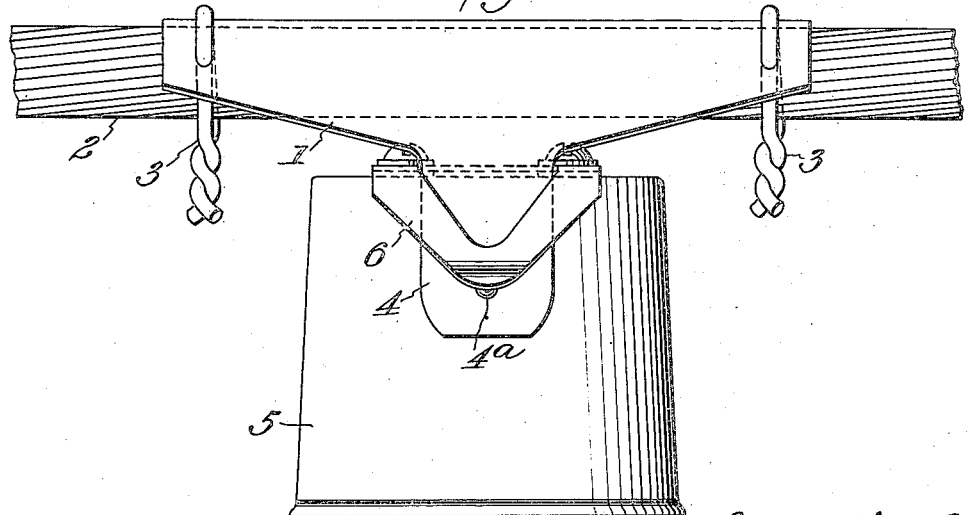
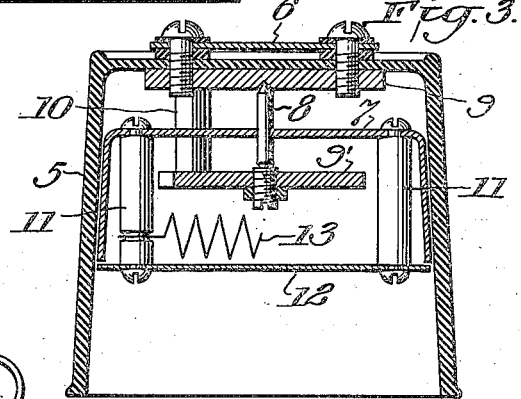
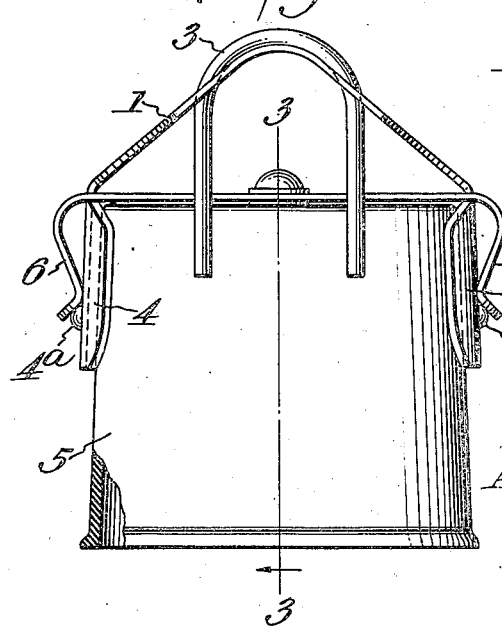
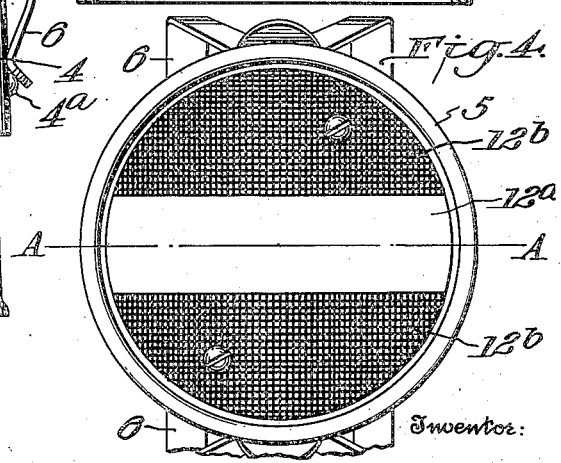
Inventor:
Harold H. Rudd,
By Potter, Pierce & Scheffler
Attorneys.

Nov. 29, 1938.   H. H. RUDD   2,138,430
CURRENT INDICATOR
Filed July 31, 1935   2 Sheets-Sheet 2
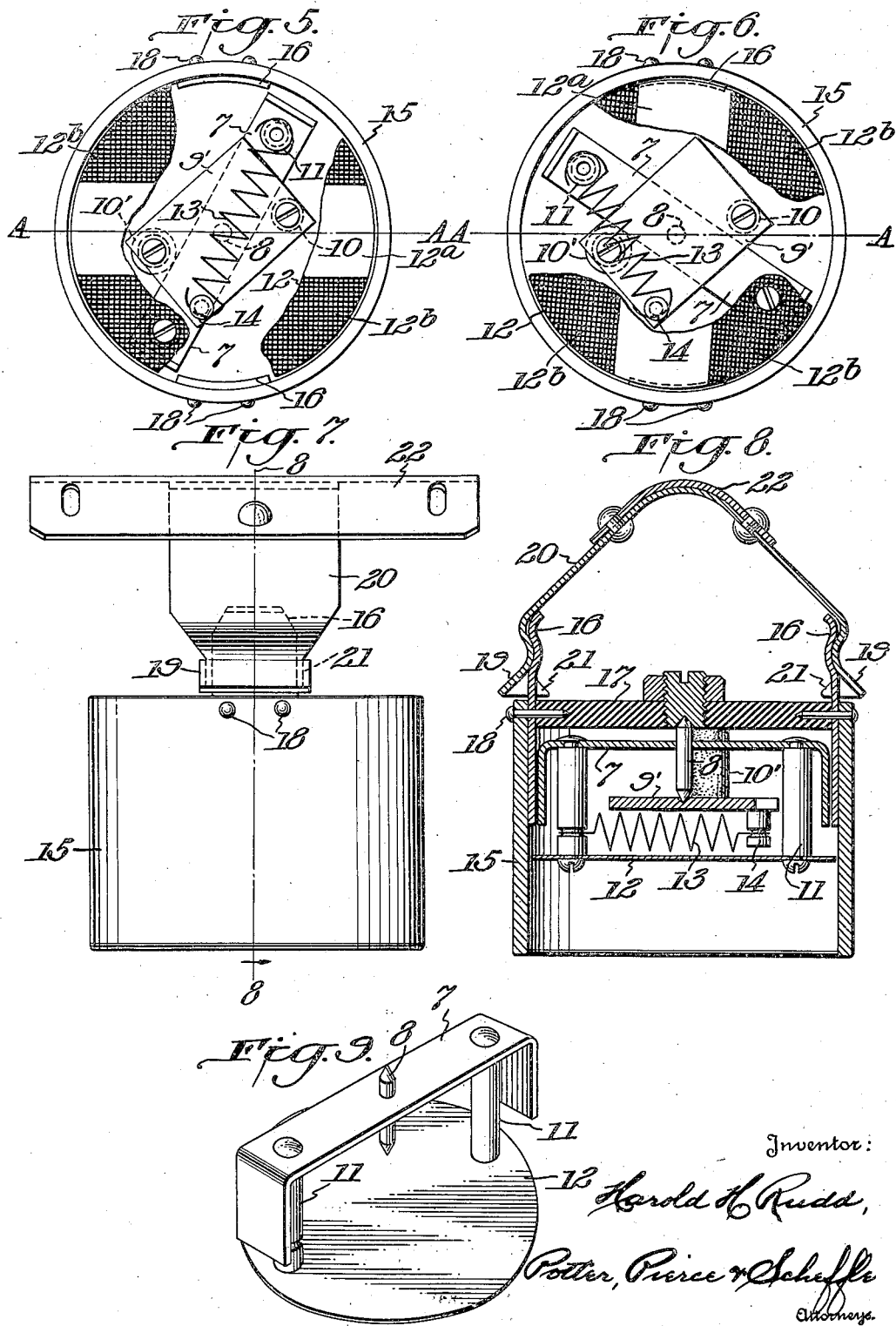

Patented Nov. 29, 1938

2,138,430

UNITED STATES PATENT OFFICE 2,138,430

CURRENT INDICATOR

Harold H. Rudd, Greensburg, Pa., assignor, by mesne assignments, to Railway & Industrial Engineering Company, Greensburg, Pa., a corporation of Delaware Application July 31, 1935, Serial No. 34,092

12 Claims. (Cl. 177—311)

This invention relates to current indicators, and particularly to devices providing a visual indication of current flow in a transmission line so long as the current flow remains within normal values, but which move into and remain in a predetermined actuated position in the event that the current flow rises above normal values.

For convenience of description, the device will be designated in the specification and claims as a "surge indicator", but it is to be understood that it is capable of more general application by so designing the several parts that the indicating element will not be moved into an abnormal or surge indicating position by the maximum current flow which may be established under either normal or abnormal conditions.

Objects of the invention are to provide a current indicator of simple and rugged construction which is entirely reliable in operation under all weather conditions when used on an exposed transmission line, and one which will provide visual signals that are easily readable, at day or night, when the indicator is mounted on an elevated line. An object is to provide a current indicating device including an inverted cup within which the indicating element is mounted, and a supporting element for securing the cup to the transmission line, the supporting element serving as a part of the magnetic system of the indicating device. A further object is to provide a surge indicator comprising a generally U-shaped strap of iron which may be secured to the line, and an inverted cup-shaped instrument casing which may be detachably connected to the strap, the indicating element of the instrument being a disk which moves in response to current flow in the line. More particularly, an object is to provide a surge indicator of the type stated in which the indicator disk snaps past a dead-center position to record the fact that the current rose above its expected normal value.

These and other objects and advantages of the invention will be apparent from the following specification when taken with the accompanying drawings in which:

Fig. 1 is a side elevation of one embodiment of the invention in position on an electrical conductor;

Fig. 2 is an end elevation of the same device;

Fig. 3 is a transverse vertical central section through the instrument casing and the parts fixed with respect thereto, as taken on line 3—3 of Fig. 2, the moving system being shown in section on the longitudinal axis of the armature;

Fig. 4 is a bottom view of the same, the indicating disk being shown in normal position;

Fig. 5 is a bottom view of another embodiment of the invention, a part of the indicating disk being broken away and the several parts being shown in normal position;

Fig. 6 is a similar view but with the parts shown in actuated or surge indicating position;

Fig. 7 is a side elevation of the modified construction;

Fig. 8 is a section on line 8—8 of Fig. 7, the armature of the moving system being shown in substantial alinement with the pole pieces of the magnetic system;

Fig. 9 is a perspective view of the armature and indicating disk.

In the drawings, the reference numeral 1 identifies an iron strap of flaring U-shape which is adapted to be mounted in inverted position upon and secured to an electrical conductor 2 by the tie wires 3 which pass through the elongated central section of the strap. For convenience of description in the specification and claims, the term "inverted" and all other terms indicative of position are to be understood as referring to the position of the parts of the apparatus when in normal operating condition on a line, as shown in side elevation in Fig. 1. The depending ends 4 of the strap serve as the pole pieces of the indicating instrument which is mounted in the inverted cup-shaped casing 5. The ends 4 pass through openings in a resilient strap 6 of non-magnetic material which is fixed to the casing 5, and the ends of strap 6 snap over the projections 4$^a$ on the pole pieces 4 to secure the casing to the strap 1. The strap 1 is first secured to the conductor by the tie wires 3 and the casing 5 is then mounted between the ends 4 of the strap or magnetic yoke.

The indicating system comprises an armature or inverted U-shaped bar of iron 7 which is secured to a pivot pin 8 that is rotatably mounted in bearings, provided by the plates 9, 9' that are spaced apart by posts 10 and are secured to the cup 5. A pair of posts 11 are mounted on the armature 7 and carry a disk 12 which may be, and preferably is, a sheet of aluminum.

As viewed from below, Fig. 4, the central zone 12$^a$ and outer zones 12$^b$ are of contrasting color and, when the disk is of aluminum, this effect may be obtained by polishing the central zone and coating the outer zone with a black enamel.

The disk 12 is normally positioned so that the bright central zone 12$^a$ extends transversely of the depending arms 4 of the strap 1, and the disk is yieldingly retained in this position by the spring 13 which extends between one post 11 of the moving system and an anchor post 14 which is mounted on the fixed plate 9'. The depending arms 4 of the strap 1 act as the poles of the magnetic system of the indicating device and the armature 7 is attracted towards the poles in accordance with the magnetic flux established in the strap 1 by current flow in the line conductor 2.

As indicated in Figs. 2 and 3, the cup or instrument casing is formed of an insulating material such as porcelain or, preferably, a molded resin. The walls of the cup and the clearance between the armature 7 and the cup results in relatively large gaps between the pole pieces and the armature. A preferred construction which affords increased sensitivity by decreasing these gaps is illustrated in Figs. 5 to 8, inclusive.

In this form of the invention, the cup 15 may be of insulating material or of non-magnetic metal, such as brass, Monel metal, or non-magnetic steel. The pole pieces 16 extend through the upper wall of the cup 15 and therefore need be spaced from the depending ends of the armature by the minimum distances required for a proper working clearance between the pole pieces and the moving system. The general form of the indicating device may be substantially like that shown in Figs. 2 and 3, and corresponding parts are identified by like reference numerals but will not be specifically described.

The cup 15 is shown as comprising a short tubular section of metal which is closed at its upper end by a disk 17 or top wall of insulating material. With this construction, the pole pieces are preferably secured in place by pins 18 or equivalent fastening devices which attach the end wall 17 to the cylindrical section of cup 15. The upper ends of the pole pieces have a slight reverse bend which serves to lock the instrument assembly to the depending end portions 19 of an iron strap 20 of inverted and flaring U shape, the ends 19 being correspondingly bent and having lateral ears 21 for facilitating the insertion of the pole pieces 16 into the ends of the strap 20. The strap 20 may have extensions for securing the strap to the line conductor or, as shown in Fig. 7, these extensions may be provided by riveting a separate curved plate 22 to the strap 20.

In the absence of current flow in the conductor 2, the moving system is retained in the position shown in Fig. 5 by the spring 13 which holds one side of the armature 7 against a sleeve 10' that is carried by one of the fixed posts 10. The polished strip 12ª of the disk 12 extends transversely to the plane of the pole pieces 16 (or the pole pieces 4 of Fig. 1) and therefore parallel to the axis (indicated by broken line A—A) of the line conductor to which the device is secured. With increasing current flow in the line, the armature is attracted by the pole pieces and moves in a counterclockwise direction against the force of the spring 13. The particular construction shown in Figs. 5 and 6 is intended to function as a surge indicator, and the two ends of the spring 13 are therefore so positioned that the axis of the spring passes over the axis of the pivot pin 8 before the armature 7 has moved into full alinement with the pole pieces 16. When the armature thus passes through dead-center, the moving system snaps into the position shown in Fig. 6, where it is arrested by the contact of the other side of armature 7 with the fixed sleeve 10'. The bright zone 12ª of the indicating disk 12 now extends transversely of the line conductor, and will remain in that position until it is manually reset to normal position. The resetting operation may be effected by means of a rubber pad or a permanent magnet mounted on the end of an insulated switch stick.

Surge indicators of this construction may be calibrated for actuation at different current values by an appropriate choice of the strength of the spring 13. For all normal current values the disk 12 will be moved through an angle which depends upon the magnitude of the current and the strength of spring 13, but the disk will snap past dead center position when the current rises to an abnormal value corresponding to a predetermined voltage surge.

It is to be noted that the illustrated device is more accurately identified by the term "over current indicator" than by the term "surge indicator" which is now in common use. The moving system responds to current flow and not to voltage changes or voltage surges. There is a slight lag in the response of the moving system to current values which do not greatly exceed the critical value and this delay prevents a false actuation of the device when a relatively low current surge is present for only a few cycles. This condition may exist when, for example, a falling tree branch establishes a momentary and relatively high resistance short between two lines of a transmission system.

As compared with prior current and surge indicators of this general type, the invention has the decided advantage that the indicating member is parallel to the ground, thus facilitating a reading of the indicator when the transmission line on which it is mounted is at a relatively high elevation, say of the order of one hundred feet. All moving parts of the indicator are protected from the weather, and the indicator may be readily attached to a line on which current is flowing by means of the standard "hot line" tools.

It will be apparent that there is considerable latitude in the design and construction of current indicators embodying this invention, and that various changes may be made in the illustrated devices without departure from the spirit of my invention as set forth in the following claims.

I claim:

1. A current indicator comprising an iron strap of approximately U-form adapted to be inverted over and mounted upon a substantially horizontal conductor, a non-magnetic casing of inverted cup shape and means for attaching the same to the depending ends of said strap, an armature within the casing, means mounting said armature for pivotal movement within said casing and about a vertical axis, spring means opposing motion of said armature by the magnetic field established in said iron strap when current flows through a conductor upon which the strap is mounted, and an indicating disk carried by said armature, said disk being visible through the open bottom of the casing.

2. A current indicator comprising a non-magnetic casing having the form of an inverted cup, an armature and means mounting the same for pivotal movement substantially about a vertical axis within the casing, means yieldingly retaining said armature in a predetermined position, an indicating member carried by said armature and visible through the bottom of the casing, and a magnetic system comprising a yoke and spaced poles, said yoke having a horizontal opening therethrough for receiving a substantially horizontal line conductor, and said spaced poles cooperating with said armature to form a measuring instrument.

3. A current indicator as claimed in claim 2, wherein said magnetic system comprises a strap of magnetic material of inverted U-form, the central portion of said strap constituting said yoke and the depending ends of said strap constituting said poles.

4. A current indicator as claimed in claim 2, wherein said poles comprise spaced members secured to said casing, and said yoke comprises a strap of magnetic material of inverted U-form with means at the ends thereof for connection with the ends of the respective pole members.

5. A current indicator comprising a substantially cylindrical casing, an armature within the casing, means supporting said armature for pivotal movement about an axis substantially coinciding with the axis of said casing, a magnetic system for establishing a field in which said armature is located, said system including a yoke, for supporting said casing from a substantially horizontal line conductor, a disk secured to said armature and having a flat surface visible from one end of the casing, said disk having a central zone of one color separating two opposed segmental areas of a contrasting color, stop means limiting rotation of said armature and disk approximately to 90° from a zero-current position of said disk with the central zone thereof parallel to a line conductor passing through said yoke to a surge-indicating position of said disk with the central zone thereof normal to the line conductor, and spring means for opposing rotation of said armature and disk from said no-current position through a portion of the range of movement thereof and for rotating said armature and disk into said surge-indicating position when said armature has been displaced through said portion of the range of movement by the magnetic field established in said magnetic system.

6. A current indicator comprising a magnetic yoke of U-form adapted to be inverted over a line conductor, means for securing the magnetic yoke to the line conductor, an inverted cup-shaped casing, means for detachably connecting said casing to the depending ends of said yoke, magnetic means within said casing, means mounting said magnetic means for movement in response to the magnetic flux established in said yoke, and an indicating device carried by said magnetic means.

7. An over-current surge indicator comprising a magnetic yoke adapted to be secured to a line conductor, an inverted cup shape casing, means connecting said casing to the depending ends of said yoke, an armature within said cup, means mounting said armature in the magnetic field of said yoke and for rotation by the magnetic flux established in said yoke, stop means limiting the angular movement of said armature substantially to 90°, means tending to retain said armature in either of its end positions, said means comprising a spring having the ends thereof connected respectively to said armature and said casing at points which cause the axis of the spring to move past the pivotal axis of said armature as the latter moves from one end position to the other, and an indicating device secured to said armature.

8. A current indicating device comprising a magnetic yoke of U-form adapted to be inverted over a line conductor, means for securing said yoke to the conductor, a casing housing an indicator movable in response to the magnetic flux established in said yoke, and means for detachably connecting said casing to the depending ends of said yoke without disturbing said means which secures said yoke to said line conductor, thereby to position said indicator in the air gap between the ends of said magnetic yoke.

9. A current indicator as claimed in claim 8, wherein said connecting means comprises non-magnetic resilient means secured to said casing and cooperating means on the ends of said yoke.

10. A current indicator as claimed in claim 8, wherein said connecting means comprises a pair of pole pieces secured to said casing for connection to the respective depending ends of said yoke.

11. A current indicator as claimed in claim 8, wherein said connecting means comprises a non-magnetic resilient strap extending over and secured to the top of said casing, the end portions of said strap extending along and being spaced from opposite sides of the casing by less than the thickness of the ends of said yoke, said end portions being apertured to permit the ends of said yoke to pass therethrough and to extend along said casing.

12. A current indicating device comprising a magnetic yoke of U-form adapted to be inverted over a line conductor, apertured means projecting laterally from the central portion of said yoke to receive tie wires for securing said yoke to the conductor, a casing housing an indicator, means supporting said indicator for movement in response to the magnetic flux established in said yoke, and means for detachably connecting said casing to the depending ends of said yoke to position said indicator in the air gap between the ends of said magnetic yoke.

HAROLD H. RUDD.